L. S. ODELL.
PUNCTURE PROOF LAYER FOR TIRES.
APPLICATION FILED FEB. 21, 1916.
1,219,033.
Patented Mar. 13, 1917.
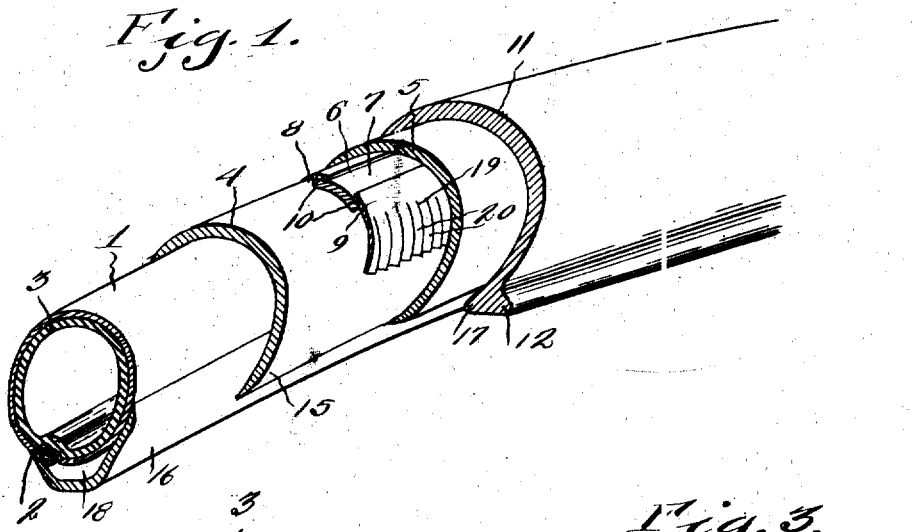
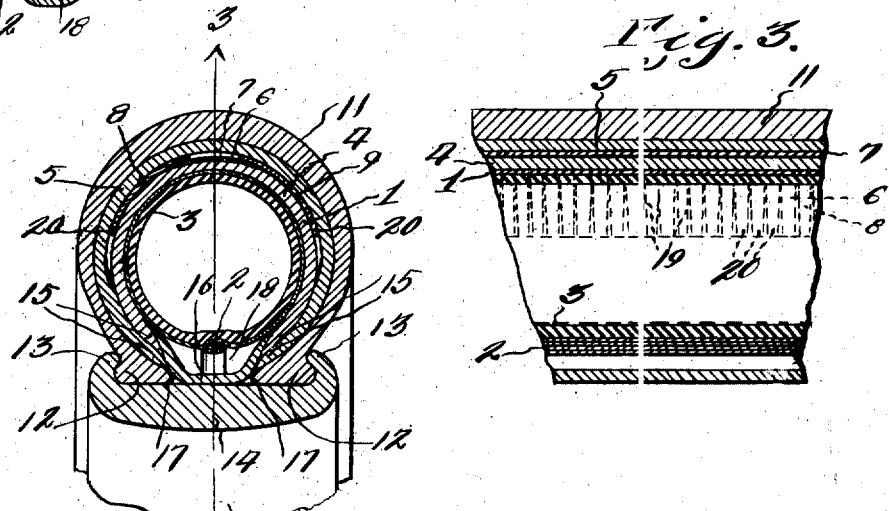
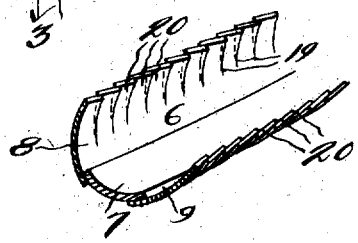

UNITED STATES PATENT OFFICE.

LEVI S. ODELL, OF FORESTVILLE, NEW YORK.

PUNCTURE-PROOF LAYER FOR TIRES.

1,219,033.

Specification of Letters Patent.

Patented Mar. 13, 1917.

Application filed February 21, 1916. Serial No. 79,682.

*To all whom it may concern:*

Be it known that I, LEVI S. ODELL, a citizen of the United States, residing at Forestville, in the county of Chautauqua, State of New York, have invented a new and useful Puncture-Proof Layer for Tires; and I do hereby declare the following to be a full, clear, and exact description of the invention, such as will enable others skilled in the art to which it appertains to make and use the same.

This invention relates to an improved blow-out and puncture proof lining for tires, and an object of the invention is to provide an improved device of this design, in which improved, simple, efficient and practical features of construction are involved.

One of the features of the invention is the provision of an inner metal tube constructed from thin sheet steel, upon the interior of which the usual inner inflating tube is arranged.

Another feature of the invention is the provision of a pair of canvas shields adjacent the outer face of the steel tube, and upon the interior of the outer clenched tie casing, said canvas shields having an intermediate steel shield, constructed of three sections, the central section, and two side sections, the central section being considerably thicker than the side sections, thereby preventing a tack or the like from penetrating sufficiently to puncture the inner tube. In other words, should a tack or the like puncture the outer casing of the tire and one of the canvas shields, the point of the tack or the like will be bent upon the central section. Should the tack or the like penetrate the outer casing of the tire and the adjacent canvas shield adjacent either one of the side sections, the point of the tack will be deflected.

Another feature of the invention is to construct the side sections of the sheet metal shield with overlapping tongues, so that the side sections of said shield will easily bend or flex.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in perspective of the blow-out puncture-proof tire constructed in accordance with the invention, showing the several sections or parts of the tire cut back, to illustrate the other sections.

Fig. 2 is a cross sectional view of the improved tire constructed in accordance with the invention.

Fig. 3 is a sectional view on line 3—3 of Fig. 2.

Fig. 4 is a detail perspective view of the sheet steel shield, which is constructed of three sections.

Referring more especially to the drawing, 1 designates an inner metal tube, which is constructed of very thin sheet steel, the edge portions of which are folded together as shown at 2 to provide a secure joint. The usual inflating tube 3 is arranged on the interior of the sheet steel tube 1. Arranged adjacent the exterior of the sheet metal tube 1 is a canvas shield 4, between which and a second canvas shield 5, a steel shield 6 is interposed. This intermediate steel shield 6 comprises three sections, the intermediate or central section 7 and the two side sections 8 and 9, which are brazed or otherwise connected at 10 to the central section 7. The central section is more or less thicker than the side sections, so that in case a tack or the like penetrates the outer casing 11 of the tire and the shield 5, the end of the tack or the like will be bent from contacting with the section 7. However, should a tack or the like penetrate the outer casing 11 of the tire and the shield 5 adjacent either one of the side sections, the tack or the like will be deflected upon the side sections. In both of these instances, the inner inflating tube is preserved against puncture. The outer casing of the tire is provided with the usual clench ribs 12, which are engaged by the clench flanges 13 of the usual rim 14. Lapping from the opposite lower sides 15 of the canvas shields 4 and 5 is a rubber strip 16, substantially U-shaped in cross section, which U-shaped strip fits between the parts 17 of the opposite inner sides of the outer tie casing 11, there being an interval of space 18 between the interior surface of the rubber strip 16 and the sheet metal tube 1, to permit the tire to give. The side sections 8 and are slitted partially transversely as shown at 19, thereby providing flexible tongues 20, which are overlapped to permit the side sections to yield incident to depression of the tire.

The invention having been set forth, what is claimed as new and useful is:—

In a tire construction, an inner sheet metal tube, an outer tire casing, a pair of canvas shields between the sheet metal tube and the tire casing, and a sheet metal shield interposed between the canvas shields and extending partially transversely of the tire, said sheet metal shields comprising three sections, an intermediate section, and two side sections, the intermediate section being thicker than the side sections and adjacent the tread of the tire, said side sections being slitted partially transversely, thereby forming tongues, which are overlapped to permit the metal shield to yield incident to the depression of the tire.

In testimony whereof I have signed my name to this specification in the presence of two subscribing witnesses.

LEVI S. ODELL.

Witnesses:
A. G. KINGSLEY,
C. C. COUNRADT.